US012777090B2

(12) United States Patent
Chen et al.

(10) Patent No.: US 12,777,090 B2
(45) Date of Patent: Oct. 27, 2026

(54) CONTENT DELIVERY NETWORK SYSTEM AND CONTENT DELIVERY METHOD

(71) Applicant: Huawei Cloud Computing Technologies Co., Ltd., Guizhou (CN)

(72) Inventors: Wei Chen, Chengdu (CN); Yan Zhou, Shanghai (CN); Xukai Hu, Chengdu (CN); Mengmeng Liang, Chengdu (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 302 days.

(21) Appl. No.: 18/743,802

(22) Filed: Jun. 14, 2024

(65) Prior Publication Data

US 2024/0333788 A1 Oct. 3, 2024

Related U.S. Application Data

(63) Continuation of application No. PCT/CN2022/138996, filed on Dec. 14, 2022.

(30) Foreign Application Priority Data

Dec. 15, 2021 (CN) ......................... 202111539778.6
Mar. 29, 2022 (CN) ......................... 202210319950.5

(51) Int. Cl.
*H04B 10/27* (2013.01)
*H04L 67/1004* (2022.01)

(52) U.S. Cl.
CPC ......... *H04L 67/1004* (2013.01); *H04B 10/27* (2013.01)

(58) Field of Classification Search
CPC ...................................................... H04B 10/27
See application file for complete search history.

(56) References Cited

U.S. PATENT DOCUMENTS

2016/0094402 A1* 3/2016 Finkelstein ........... H04L 41/022 709/226
2016/0330074 A1* 11/2016 Cook ...................... H04L 67/10
(Continued)

FOREIGN PATENT DOCUMENTS

CN 111355798 A 6/2020
CN 112491951 A 3/2021
CN 113747252 A 12/2021

OTHER PUBLICATIONS

Hui Li, Lipeng Wang and Yuefeng Ji, "Experimental demonstration of content sharing on service-oriented optical internet," 7th International Conference on Communications and Networking in China, Kunming, China, 2012, pp. 267-270, doi: 10.1109/ChinaCom.2012.6417488. (Year: 2012).*

*Primary Examiner* — Nathan M Cors
(74) *Attorney, Agent, or Firm* — Conley Rose, P.C.

(57) ABSTRACT

A content delivery network (CDN) system includes an optical network terminal configured to communicate with a CDN edge node and an optical network control center through a dedicated WAN interface, and enjoy bandwidth resources of the dedicated WAN interface, without occupying home bandwidth resources of a user. In the system, after determining that a first CDN edge node does not cache target content requested by a first client, the first CDN edge node sends a first query request to the optical network control center. Then, the optical network control center controls, based on the first query request, the first CDN edge node to request the target content from a CDN central node.

20 Claims, 8 Drawing Sheets

(56) References Cited

U.S. PATENT DOCUMENTS

| | | | | |
|---|---|---|---|---|
| 2017/0237491 | A1* | 8/2017 | Mutalik | H04L 5/14 398/115 |
| 2018/0091251 | A1* | 3/2018 | Hanneman, Jr. | H04J 14/0256 |
| 2021/0006618 | A1 | 1/2021 | Law | |

* cited by examiner

CONTENT DELIVERY NETWORK SYSTEM AND CONTENT DELIVERY METHOD

CROSS-REFERENCE TO RELATED APPLICATIONS

This is a continuation of International Patent Application No. PCT/CN2022/138996 filed on Dec. 14, 2022, which claims priority to Chinese Patent Application No. 202111539778.6 filed on Dec. 15, 2021 and Chinese Patent Application No. 202210319950.5 filed on Mar. 29, 2022, which are hereby incorporated by reference in their entireties.

TECHNICAL FIELD

Embodiments of this disclosure relate to the field of cloud technologies, and in particular, to a content delivery network (CDN) system and a content delivery method.

BACKGROUND

A CDN system is a computer network system in which mutual connections are implemented over the internet. In a specific area (for example, a national range or the like), a plurality of servers at different locations may be deployed as CDN edge nodes in the system, and a CDN edge node closest to each user is used to more quickly and reliably send content such as music, pictures, videos, applications, other files, and the like to the user, so that a problem that network congestion affects website access quality and efficiency is resolved.

Because the CDN edge nodes are deployed at a plurality of layers, high deployment costs are brought in terms of hardware resources, renting equipment rooms, or the like. To resolve this problem, in the industry, a peer-to-peer (P2P) network is integrated into a CDN system to form a P2P content delivery network (PCDN) system. A PCDN scheduling center and a PCDN node are newly added to the PCDN system, and the PCDN node is used as a node closest to a user. The PCDN node is usually deployed on a user-side-oriented router, set-top box, and personal computer (PC). The PCDN system may provide an acceleration service for a process in which the user obtains content. The PCDN scheduling center may schedule a PCDN node for the user for use, so that a terminal device used by the user may obtain needed content from the PCDN node.

Because the PCDN node is invisible to an operator, and when the PCDN node communicates with the PCDN scheduling center or other devices, used bandwidth resources occupy a part of home bandwidth resources of the user, normal internet access experience of the user is affected.

SUMMARY

Embodiments of this disclosure provide a content delivery network system combined with an optical network terminal and a content delivery method. The optical network terminal may communicate with a CDN edge node and an optical network control center through a dedicated wireless access network (WAN) interface, and enjoy bandwidth resources of the dedicated WAN interface, without occupying home bandwidth resources of a user, so that internet access experience of the user is not affected.

A first aspect of embodiments of this disclosure provides a content delivery network CDN system combined with an optical network terminal. The system includes a CDN central node, a plurality of CDN edge nodes, an optical network control center, and a plurality of optical network terminals.

When a user needs to obtain target content, a first client may be used to send a first content request to a first CDN edge node in the plurality of CDN edge nodes (that is, a CDN edge node in the plurality of CDN edge nodes). The first content request is used to request the target content.

The first CDN edge node may detect, based on the first content request from the first client, whether the first CDN edge node caches the target content. When that the first CDN edge node does not cache the target content requested by the first content request is determined, a first query request for the target content is sent to the optical network control center.

After receiving the first query request from the first CDN edge node, the optical network control center may detect, based on the first query request, whether there is an optical network terminal caching the target content. If determining that there is no optical network terminal storing the target content, the optical network control center notifies the first CDN edge node to request the target content from the CDN central node.

After the first CDN edge node obtains the target content from the CDN central node, the optical network control center may send a content pull instruction for the target content cached in the first CDN edge node to N optical network terminals, where N is a positive integer greater than 0.

After receiving the content pull instruction from the optical network control center, the N optical network terminals may separately obtain the target content from the first CDN edge node based on the content pull instruction, and cache the target content. Then, the N optical network terminals separately send caching success notifications to the optical network control center, to notify the optical network control center that the target content is successfully cached, in other words, notify the optical network control center that preheating of the target content is completed.

After receiving the caching success notifications from the N optical network terminals, the optical network control center may record, based on the caching success notifications, that the N optical network terminals cache the target content.

The CDN system includes the CDN central node, the plurality of CDN edge nodes, the optical network control center, and the plurality of optical network terminals. After determining that the first CDN edge node in the plurality of CDN edge nodes does not cache the target content requested by the first client, the first CDN edge node sends the first query request to the optical network control center. Then, the optical network control center detects, based on the first query request, whether there is an optical network terminal storing the target content. If there is no optical network terminal storing the target content, the optical network control center controls the first CDN edge node to request the target content from the CDN central node. After the first CDN edge node obtains the target content from the CDN central node, the optical network control center may send the content pull instruction for the target content cached in the first CDN edge node to the N optical network terminals, so that the N optical network terminals separately obtain the target content from the first CDN edge node based on the content pull instruction, to complete caching of the target content. In the foregoing process, because the optical network terminal may be a device customized by an operator (in other words, the optical network terminal is visible to the operator), the operator may dispose a new dedicated WAN interface for the optical network terminal, and configure specific bandwidth resources for the WAN interface. In this case, the optical network terminal may communicate with the first CDN edge node and the optical network control center through the dedicated WAN interface, and enjoy bandwidth resources of the dedicated WAN interface, without occupying home bandwidth resources of the user, so that internet access experience of the user is not affected.

In a possible implementation, a second CDN edge node in the plurality of CDN edge nodes is configured to: receive a second content request sent by a second client, and when determining that the second CDN edge node does not cache the target content requested by the second content request, send a second query request for the target content to the optical network control center. The optical network control center is further configured to: determine, based on the second query request, that the optical network control center records that the N optical network terminals cache the target content, select a target optical network terminal from the N optical network terminals, and send access information of the target optical network terminal to the second CDN edge node. The second CDN edge node is further configured to send the access information to the second client. The access information indicates the second client to obtain the target content from the target optical network terminal. In the foregoing implementation, after determining that the second CDN edge node in the plurality of CDN edge nodes does not cache the target content requested by the second client, the second CDN edge node sends the second query request to the optical network control center. Then, the optical network control center detects, based on the second query request, whether there is an optical network terminal storing the target content. Because that the N optical network terminal cache the target content has been recorded, the optical network control center may select the target optical network terminals from the N optical network terminals, and send the access information of the target optical network terminals to the second CDN edge node. Then, the second CDN edge node may send the access information of the target optical network terminals to the second client, so that the second client obtains the target content from the target optical network terminals based on the access information. In the foregoing process, because the target optical network terminal may be the device customized by the operator, the operator may dispose the new dedicated WAN interface for the target optical network terminal, and configure specific bandwidth resources for the WAN interface. In this case, the target optical network terminal may communicate with the client through the dedicated WAN interface, and enjoy bandwidth resources of the dedicated WAN interface, without occupying the home bandwidth resources of the user, so that the internet access experience of the user is not affected.

In a possible implementation, the optical network control center is configured to select the target optical network terminal from the N optical network terminals based on one or any combination of load, used downlink bandwidth, total quantities of cached content, storage space, and central processing unit (CPU) usage of the N optical network terminals. In the foregoing implementation, for any optical network terminal in the N optical network terminals caching the target content, the optical network control center may determine performance of the optical network terminal based on one or any combination of load, used downlink bandwidth, a total quantity of cached content, storage space, and CPU usage of the optical network terminal. In this way, the optical network control center may determine performance of the N optical network terminals, and compare the performance of the N optical network terminals with each other, to use an optical network terminal with optimal performance as the target optical network terminal. For example, the optical network control center may consider, in the N optical network terminals, an optical network terminal with lowest load, minimum used downlink bandwidth, a smallest total quantity of cached content, maximum storage space, and lowest CPU usage as the optical network terminal with the optimal performance, and determine the optical network terminal with the optimal performance as the target optical network terminal.

In a possible implementation, the optical network control center is connected to K optical network terminals. The optical network control center is further configured to: synchronize a quantity of request times of the target content with the plurality of CDN edge nodes, and select the N optical network terminals from the K optical network terminals based on the quantity of request times. A larger quantity of request times of the target content indicates a larger value of N, and K is a positive integer greater than N. In the foregoing implementation, after synchronizing the quantity of request times of the target content with the first CDN edge node, the optical network control center may determine a value of N based on the quantity of request times of the target content. Then, the optical network control center may remove an unusable optical network terminal from the K optical network terminals, and select the N optical network terminals, from remaining usable optical network terminals, as an optical network terminal that is to cache the target content. The quantity of request times of the target content is positively correlated with N.

In a possible implementation, the first CDN edge node is configured to cache the target content after obtaining the target content from the CDN central node, and send the target content to the first client.

A second aspect of embodiments of this disclosure provides a content delivery network CDN system combined with an optical network terminal. The system includes: a plurality of CDN edge nodes, where a second CDN edge node in the plurality of CDN edge nodes is configured to: receive a second content request sent by a second client, and when determining that the second CDN edge node does not cache target content requested by the second content request, send a second query request for the target content to an optical network control center; and the optical network control center, configured to: determine, based on the second query request, that the optical network control center records that N optical network terminals cache the target content, select a target optical network terminal from the N optical network terminals, and send access information of the target optical network terminal to the second CDN edge node. The second CDN edge node is further configured to send the access information to the second client. The access information indicates the second client to obtain the target content from the target optical network terminal.

The CDN system provided in this embodiment of this disclosure includes a CDN central node, the plurality of CDN edge nodes, the optical network control center, and a plurality of optical network terminals. After determining that the second CDN edge node in the plurality of CDN edge nodes does not cache the target content requested by the second client, the second CDN edge node sends the second query request to the optical network control center. Then, the optical network control center detects, based on the second query request, whether there is an optical network terminal storing the target content. Because that the N optical network terminal cache the target content has been recorded, the optical network control center may select the target optical network terminals from the N optical network terminals, and send the access information of the target optical network terminals to the second CDN edge node. Then, the second CDN edge node may send the access information of the target optical network terminals to the second client, so that the second client obtains the target content from the target optical network terminals based on the access information. In the foregoing process, because the target optical network terminal may be a device customized by an operator (in other words, the optical network terminal is visible to the operator), the operator may dispose a new dedicated WAN interface for the target optical network terminal, and configure specific bandwidth resources for the WAN interface. In this case, the target optical network terminal may communicate with the client through the dedicated WAN interface, and enjoy bandwidth resources of the dedicated WAN interface, without occupying home bandwidth resources of a user, so that internet access experience of the user is not affected.

In a possible implementation, the optical network control center is configured to: be connected to K optical network terminals, synchronize a quantity of request times of the target content with the plurality of CDN edge nodes, and select the N optical network terminals from the K optical network terminals based on the quantity of request times. A larger quantity of request times indicates a larger value of N, and K is a positive integer greater than N.

In a possible implementation, a first CDN edge node is configured to cache the target content after obtaining the target content from the CDN central node, and send the target content to a first client.

A third aspect of embodiments of this disclosure provides a content delivery method based on an optical network terminal. The method includes: The optical network terminal receives a content pull instruction that is sent by an optical network control center and that is for target content cached in a first CDN edge node, obtains the target content from the first CDN edge node for caching, and sends a caching success notification to the optical network control center. The optical network terminal receives a target content obtaining request sent by a second client, and sends the target content to the second client based on the target content obtaining request.

A CDN system to which the foregoing method is applied includes a CDN central node, a plurality of CDN edge nodes, the optical network control center, and a plurality of optical network terminals. After determining that a second CDN edge node in the plurality of CDN edge nodes does not cache the target content requested by the second client, the second CDN edge node sends a second query request to the optical network control center. Then, the optical network control center detects, based on the second query request, whether there is an optical network terminal storing the target content. Because that N optical network terminal cache the target content has been recorded, the optical network control center may select a target optical network terminals from the N optical network terminals, and send access information of the target optical network terminals to the second CDN edge node. Then, the second CDN edge node may send the access information of the target optical network terminals to the second client, so that the second client obtains the target content from the target optical network terminals based on the access information. In the foregoing process, because the target optical network terminal may be a device customized by an operator (in other words, the optical network terminal is visible to the operator), the operator may dispose a new dedicated WAN interface for the target optical network terminal, and configure specific bandwidth resources for the WAN interface. In this case, the target optical network terminal may communicate with the client through the dedicated WAN interface, and enjoy bandwidth resources of the dedicated WAN interface, without occupying home bandwidth resources of a user, so that internet access experience of the user is not affected.

A fourth aspect of embodiments of this disclosure provides a content delivery method based on an optical network control center. The method includes: The optical network control center receives a first query request that is sent by a first CDN edge node and that is for target content. The optical network control center notifies, based on the first query request, the first CDN edge node to request the target content from a CDN central node. The optical network control center sends a content pull instruction for the target content cached in the first CDN edge node to N optical network terminals, where N is a positive integer greater than 0. The optical network control center records, based on caching success notifications sent by the N optical network terminals, that the N optical network terminals cache the target content.

A CDN system to which the foregoing method is applied includes the CDN central node, a plurality of CDN edge nodes, the optical network control center, and a plurality of optical network terminals. After determining that the first CDN edge node in the plurality of CDN edge nodes does not cache the target content requested by a first client, the first CDN edge node sends the first query request to the optical network control center. Then, the optical network control center detects, based on the first query request, whether there is an optical network terminal storing the target content. If there is no optical network terminal storing the target content, the optical network control center controls the first CDN edge node to request the target content from the CDN central node. After the first CDN edge node obtains the target content from the CDN central node, the optical network control center may send the content pull instruction for the target content cached in the first CDN edge node to the N optical network terminals, so that the N optical network terminals separately obtain the target content from the first CDN edge node based on the content pull instruction, to complete caching of the target content. In the foregoing process, because the optical network terminal may be a device customized by an operator (in other words, the optical network terminal is visible to the operator), the operator may dispose a new dedicated WAN interface for the optical network terminal, and configure specific bandwidth resources for the WAN interface. In this case, the optical network terminal may communicate with the first CDN edge node and the optical network control center through the dedicated WAN interface, and enjoy bandwidth resources of the dedicated WAN interface, without occupying home bandwidth resources of a user, so that internet access experience of the user is not affected.

In a possible implementation, the method further includes: The optical network control center receives a second query request that is sent by a second CDN edge node and that is for the target content. The optical network control center determines, based on the second query request, that the optical network control center records that the N optical network terminals cache the target content, selects a target optical network terminal from the N optical network terminals, and sends access information of the target optical network terminal to the second CDN edge node.

In a possible implementation, that the optical network control center selects a target optical network terminal from the N optical network terminals includes: The optical network control center selects the target optical network terminal from the N optical network terminals based on one or any combination of load, used downlink bandwidth, total quantities of cached content, storage space, and central processing unit CPU usage of the N optical network terminals.

In a possible implementation, the optical network control center is connected to K optical network terminals. The method further includes: The optical network control center synchronizes a quantity of request times of the target content with a plurality of CDN edge nodes, and selects the N optical network terminals from the K optical network terminals based on the quantity of request times. A larger quantity of request times indicates a larger value of N, and K is a positive integer greater than N.

A fifth aspect of embodiments of this disclosure provides an optical network terminal. The optical network terminal includes: a receiving module, configured to: receive a content pull instruction that is sent by an optical network control center and that is for target content cached in a first CDN edge node, and obtain the target content from the first CDN edge node for caching; and a sending module, configured to send a caching success notification to the optical network control center. The receiving module is further configured to receive a target content obtaining request sent by a second client. The sending module is further configured to send the target content to the second client based on the target content obtaining request.

A sixth aspect of embodiments of this disclosure provides an optical network control center. The optical network control center includes: a receiving module, configured to receive a first query request that is sent by a first CDN edge node and that is for target content; a sending module, configured to notify, based on the first query request, the first CDN edge node to request the target content from a CDN central node, where the sending module is further configured to send a content pull instruction for the target content cached in the first CDN edge node to N optical network terminals, where N is a positive integer greater than 0; and the receiving module is further configured to receive caching success notifications sent by the N optical network terminals; and a processing module, configured to record, based on the caching success notifications, that the N optical network terminals cache the target content.

In a possible implementation, the receiving module is further configured to receive a second query request that is sent by a second CDN edge node and that is for the target content. The processing module is further configured to: determine, based on the second query request, that the processing module records that the N optical network terminals cache the target content, and select a target optical network terminal from the N optical network terminals. The sending module is further configured to send access information of the target optical network terminal to the second CDN edge node.

In a possible implementation, the processing module is configured to select the target optical network terminal from the N optical network terminals based on one or any combination of load, used downlink bandwidth, total quantities of cached content, storage space, and central processing unit CPU usage of the N optical network terminals.

In a possible implementation, the optical network control center is connected to K optical network terminals. The processing module is further configured to: synchronize a quantity of request times of the target content with a plurality of CDN edge nodes, and select the N optical network terminals from the K optical network terminals based on the quantity of request times. A larger quantity of request times indicates a larger value of N, and K is a positive integer greater than N.

A seventh aspect of embodiments of this disclosure provides an optical network terminal. The optical network terminal includes a storage and a processor.

The storage stores code, and the processor is configured to execute the code. When the code is executed, the optical network terminal performs steps of the method according to the third aspect.

An eighth aspect of embodiments of this disclosure provides an optical network control center. The optical network control center includes a storage and a processor. The storage stores code, and the processor is configured to execute the code. When the code is executed, the optical network control center performs steps of the method according to the fourth aspect or any one of the possible implementations of the fourth aspect.

A ninth aspect of embodiments of this disclosure provides a computer storage medium. The computer storage medium stores a computer program. When the program is executed by a computer, the computer is enabled to implement the method according to the second aspect or any one of the possible implementations of the second aspect.

A tenth aspect of embodiments of this disclosure provides a computer program product. The computer program product stores instructions. When the instructions are executed by a computer, the computer is enabled to implement the method according to the second aspect or any one of the possible implementations of the second aspect.

A CDN system in this embodiment of this disclosure includes a CDN central node, a plurality of CDN edge nodes, an optical network control center, and a plurality of optical network terminals. After determining that a first CDN edge node in the plurality of CDN edge nodes does not cache target content requested by a first client, the first CDN edge node sends a first query request to the optical network control center. Then, the optical network control center detects, based on the first query request, whether there is an optical network terminal storing the target content. If there is no optical network terminal storing the target content, the optical network control center controls the first CDN edge node to request the target content from the CDN central node. After the first CDN edge node obtains the target content from the CDN central node, the optical network control center may send a content pull instruction for the target content cached in the first CDN edge node to N optical network terminals, so that the N optical network terminals separately obtain the target content from the first CDN edge node based on the content pull instruction, to complete caching of the target content. In the foregoing process, because the optical network terminal may be a device customized by an operator (in other words, the optical network terminal is visible to the operator), the operator may dispose a new dedicated WAN interface for the optical network terminal, and configure specific bandwidth resources for the WAN interface. In this case, the optical network terminal may communicate with the first CDN edge node and the optical network control center through the dedicated WAN interface, and enjoy bandwidth resources of the dedicated WAN interface, without occupying home bandwidth resources of a user, so that internet access experience of the user is not affected.

DESCRIPTION OF EMBODIMENTS

Embodiments of this disclosure provide a content delivery network system combined with an optical network terminal and a content delivery method. The optical network terminal may communicate with a CDN edge node and an optical network control center through a dedicated WAN interface, and enjoy bandwidth resources of the dedicated WAN interface, without occupying home bandwidth resources of a user, so that internet access experience of the user is not affected.

In the specification, claims, and accompanying drawings of this disclosure, the terms "first", "second", and the like are used to distinguish between similar objects, but do not necessarily describe a specific order or sequence. It should be understood that the terms used in such a way are interchangeable in proper cases, and this is merely a distinguishing manner used when objects having a same attribute are described in embodiments of this disclosure. In addition, the terms "include", "have", and any other variants are intended to cover the non-exclusive inclusion, so that a process, method, system, product, or device that includes a series of units is not necessarily limited to those units, but may include other units not expressly listed or inherent to the process, method, product, or device.

A CDN system is a computer network system in which mutual connections are implemented over the internet. In a specific area (for example, a national range or the like), a plurality of servers at different locations may be deployed as CDN edge nodes in the system, and a CDN edge node closest to each user is used to more quickly and reliably send content such as music, pictures, videos, applications, other files, and the like to the user, so that a problem that network congestion affects website access quality and efficiency is resolved.

Figure 1:
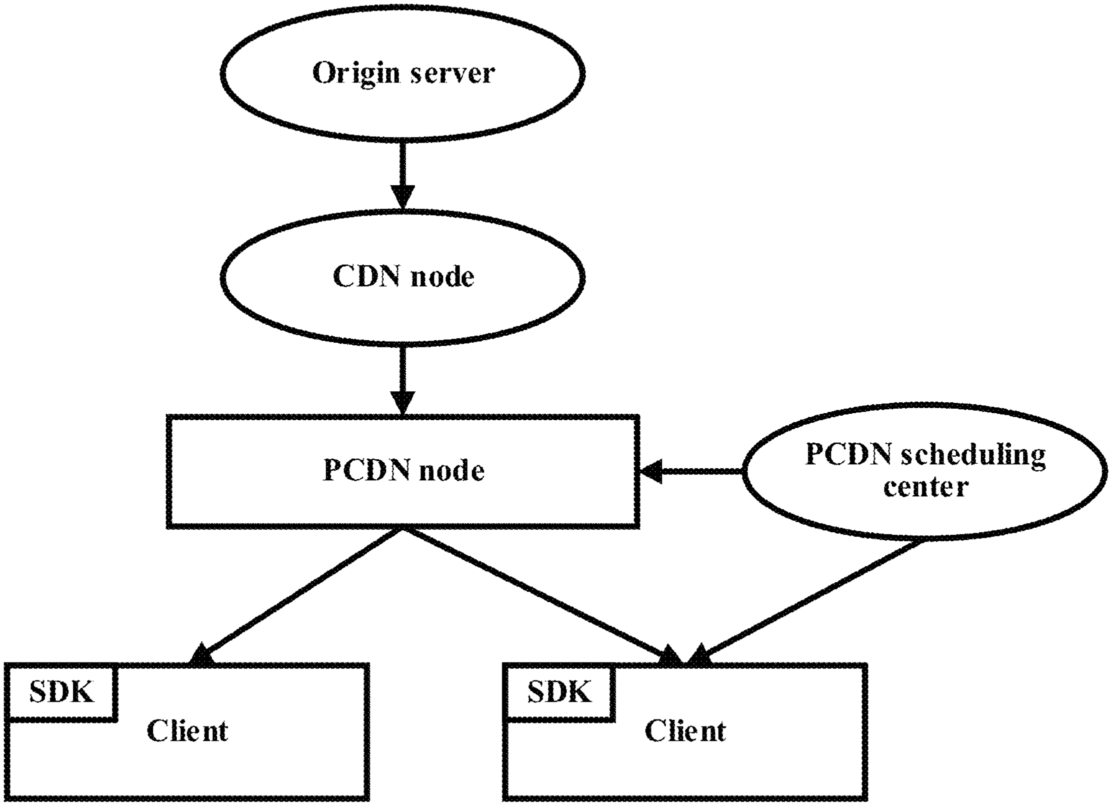
FIG. 1 is a schematic diagram of a structure of a PCDN system.

Because the CDN edge nodes are deployed at a plurality of layers, high deployment costs are brought in terms of hardware resources, renting equipment rooms, or the like. To resolve this problem, in the industry, a peer to peer P2P network is integrated into a CDN system to form a PCDN system. As shown in FIG. 1 (FIG. 1 is a schematic diagram of a structure of a PCDN system), a PCDN scheduling center and a PCDN node are newly added to the PCDN system, and the PCDN node is used as a node closest to a user. The PCDN node is usually deployed on a user side-oriented router, set-top box, and PC. The PCDN system may provide an acceleration service for a process in which the user obtains content. The PCDN scheduling center may schedule a PCDN node for the user for use, so that a terminal device used by the user may obtain needed content from the PCDN node.

Because the PCDN node is invisible to an operator, bandwidth resources allocated by the operator to a device on which the PCDN node is located is fixed, and when the PCDN node communicates with the PCDN scheduling center, a terminal, or other devices, bandwidth resources used by the PCDN node occupy a part of home bandwidth resources of the user (in other words, steal a part of home bandwidth resources of the user), normal internet access experience of the user is affected.

Further, the terminal device used by the user may further need to additionally integrate a P2P software development kit (SDK), to communicate with the PCDN scheduling center and the PCDN node based on the SDK. However, the SDK is usually unreliable and cannot be widely used.

Figure 2:
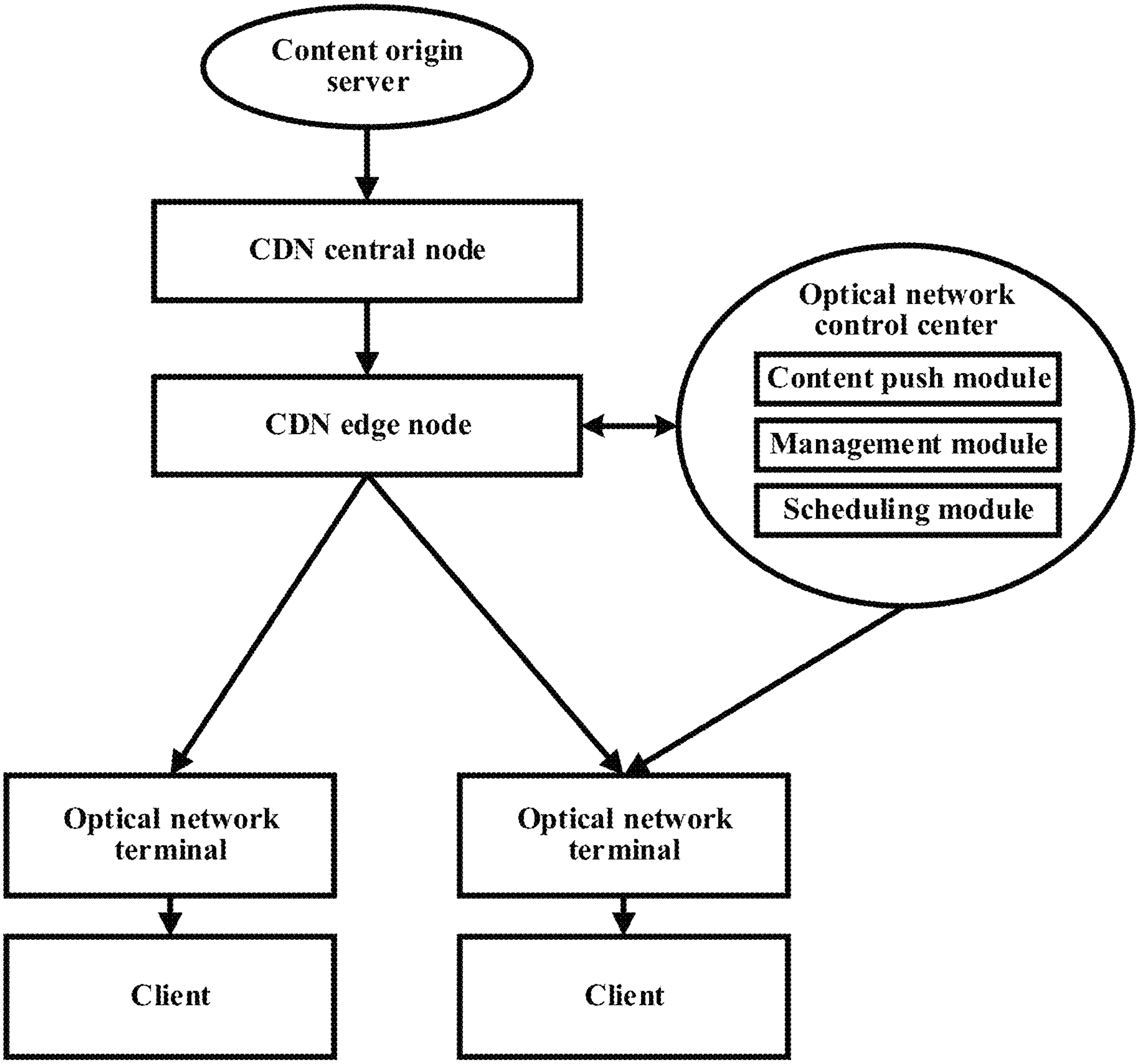
FIG. 2 is a schematic diagram of a structure of a CDN system according to an embodiment of this disclosure.

To resolve the foregoing problem, an embodiment of this disclosure provides a new CDN system. The system combines technologies. As shown in FIG. 2 (FIG. 2 is a schematic diagram of a structure of a CDN system according to an embodiment of this disclosure), the system includes a content origin server, a CDN central node, a plurality of CDN edge nodes, an optical network control center, and a plurality of optical network terminals. These nodes are embodied as deployment at a plurality of layers. If a node is farther from a client used by a user in FIG. 2, it indicates that an actual geographical location of the node is farther from the user. Various nodes are respectively described below.

The content origin server is usually a physical server. The content origin server may serve as a source of content such as music, pictures, videos, applications, other files, and the like, to provide the content for a lower-level node.

The CDN central node (which may also be referred to as a CDN scheduling center) is usually a physical server. The CDN central node is configured to uniformly manage the plurality of CDN edge nodes. The CDN central node is located between the content origin server and the plurality of CDN edge nodes, and may send content from the content origin server to the plurality of CDN edge nodes.

The CDN edge node may be embodied in a plurality of manners, and may be a physical server, or may be a virtual instance deployed on a physical server, such as a virtual machine (VM), a container (docker), or the like. In nodes at each layer in the system, the CDN edge node is a node closest to a user side. The CDN edge node may cache various types of content, and may communicate with the client used by the user, to provide content needed by the user for the user.

The optical network control center is usually a physical server. The optical network control center may communicate with the CDN edge node, and may also be configured to uniformly manage the plurality of optical network terminals. The optical network control center usually includes three function modules: a scheduling module, a management module, and a content push module. The three modules may also be equivalent to a processing module of the foregoing optical network control center. The scheduling module may schedule a content obtaining request of the user to an optimal optical network terminal for implementation. The content push module may identify popular content, and store (cache) proper popular content via a proper optical network terminal. The management module may obtain a status of an optical network terminal in a specific area and perform unified management.

Figure 3:
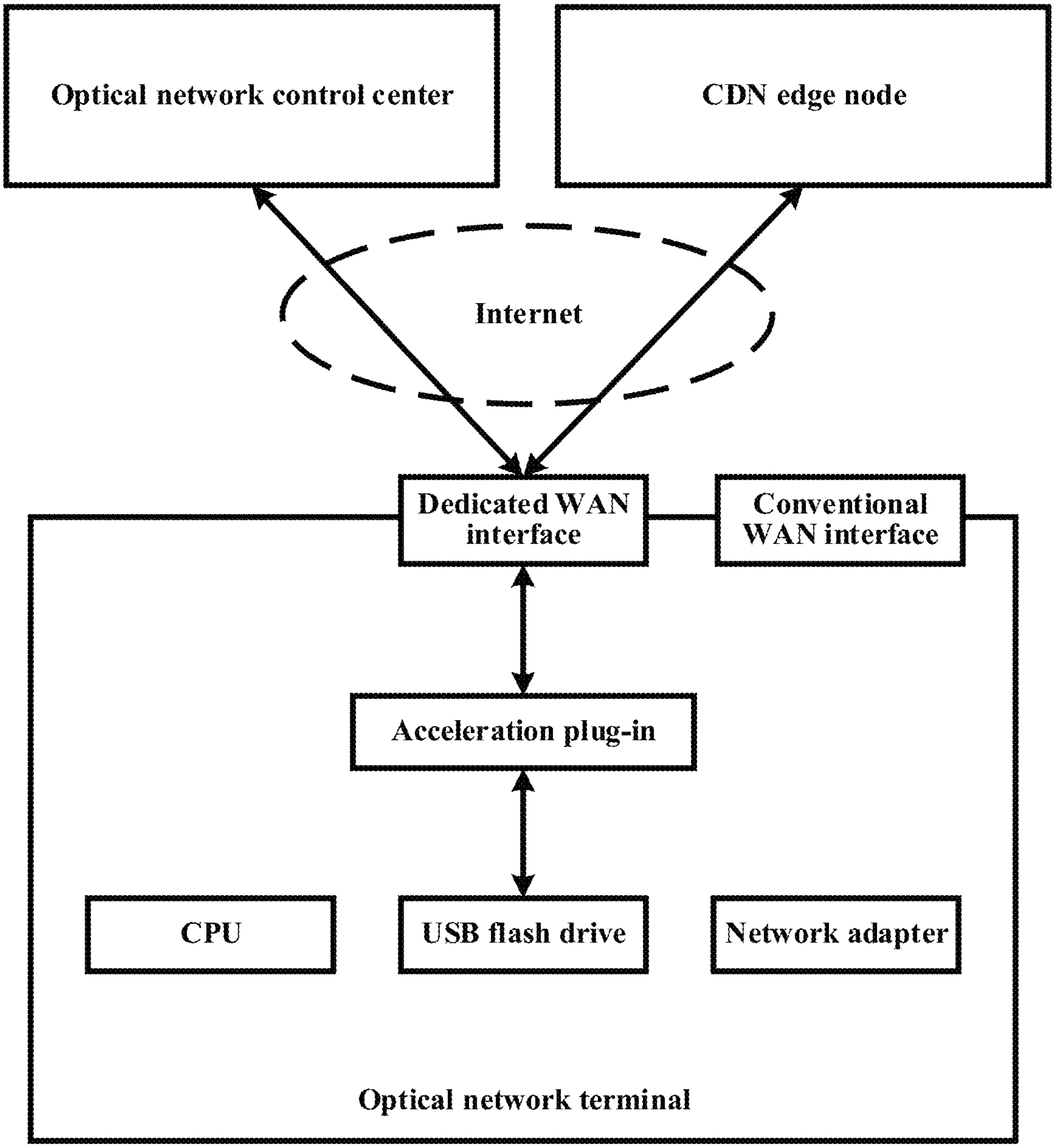
FIG. 3 is a schematic diagram of a structure of an optical network terminal according to an embodiment of this disclosure.

The optical network terminal (ONT) may be embodied in a plurality of forms. For example, the optical network terminal may be an optical modem or the like customized by an operator, and may be configured to implement an acceleration service of content provision by. As shown in FIG. 3 (FIG. 3 is a schematic diagram of a structure of an optical network terminal according to an embodiment of this disclosure), the optical network terminal is provided with two WAN interfaces, and the two WAN interfaces are independent of each other and do not interfere with each other. A first WAN interface is configured to communicate traffic needed by a user for internet access. A second WAN interface is a newly added dedicated WAN interface (where an operator may dispose the WAN interface, and configure specific bandwidth resources for the WAN interface). The WAN interface is bound to an acceleration plug-in, and is specially configured to implement an acceleration service of content provision. In other words, communication between the optical network terminal and an optical network control center, communication between the optical network terminal and a CDN edge node, and communication between the optical network terminal and a client are all implemented through the WAN interface. In addition, the optical network terminal further has various hardware resources such as computing resources (for example, a CPU, or the like), storage resources (for example, a USB flash drive, or the like), network resources (for example, a network adapter, or the like), and the like, to support a function of the optical network terminal.

Figure 4:
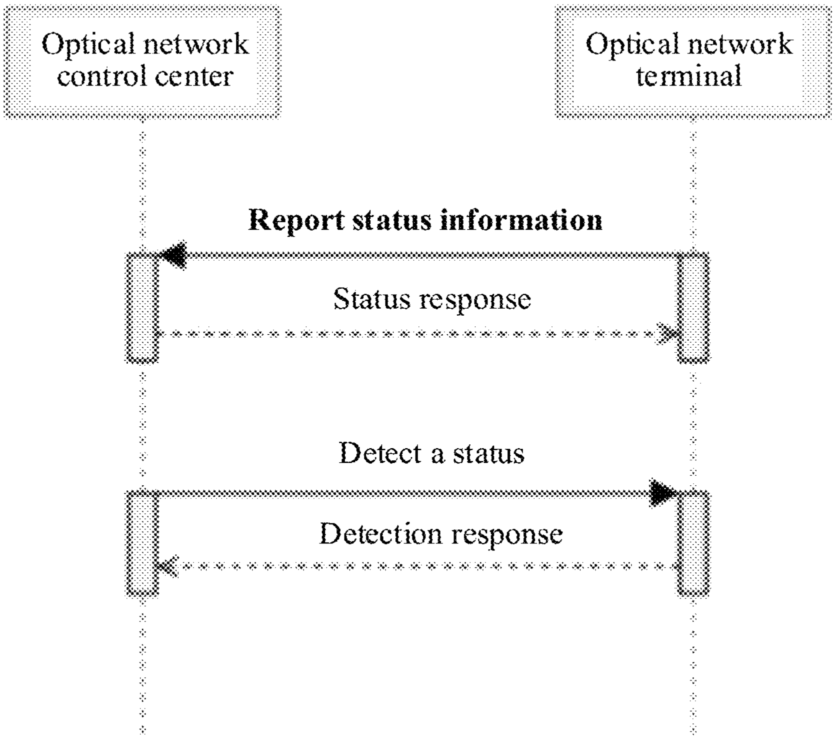
FIG. 4 is a schematic diagram of status management according to an embodiment of this disclosure.

In addition, each optical network terminal needs to periodically report status information to the optical network control center. Therefore, the optical network control center determines, based on the status information of each optical network terminal, whether each optical network terminal is a usable optical network terminal, and returns a status response. As shown in FIG. 4 (FIG. 4 is a schematic diagram of status management according to an embodiment of this disclosure), an optical network terminal may actively report status information to an optical network control center, so that the optical network control center determines usability of the optical network terminal, and feeds back the usability to the optical network terminal. Certainly, the optical network control center may also actively detect a status of the optical network terminal, so that the optical network terminal returns a detection response, and the optical network control center determines the usability of the optical network terminal based on the response.

The status information reported by the optical network terminal includes: an internet protocol (IP) address and/or a domain name of the optical network terminal; a network address translation (NAT) type identifier of the optical network terminal; total storage space and currently used storage space of a USB flash drive in the optical network terminal; total uplink/downlink bandwidth and currently used bandwidth of a dedicated WAN interface in the optical network terminal; a quantity of content obtaining requests received by the optical network terminal; and a quantity of content being pulled (obtained) by the optical network terminal; and CPU usage; input/output (IO) usage, memory usage, a health degree (where this value may be obtained by evaluating at least one of the foregoing items), and the like.

Figure 5:
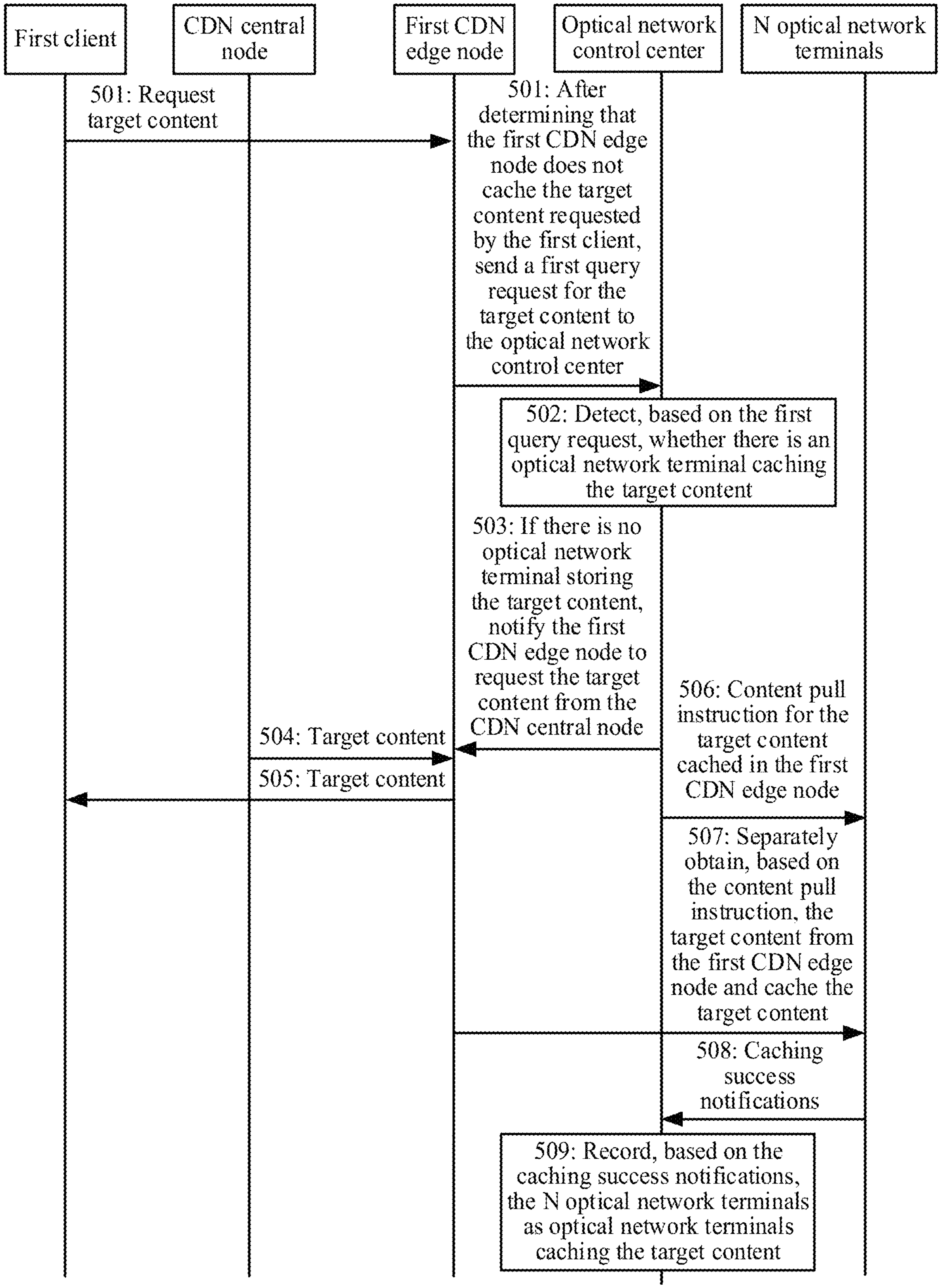
FIG. 5 is a schematic flowchart of a content delivery method according to an embodiment of this disclosure.
Figure 6:
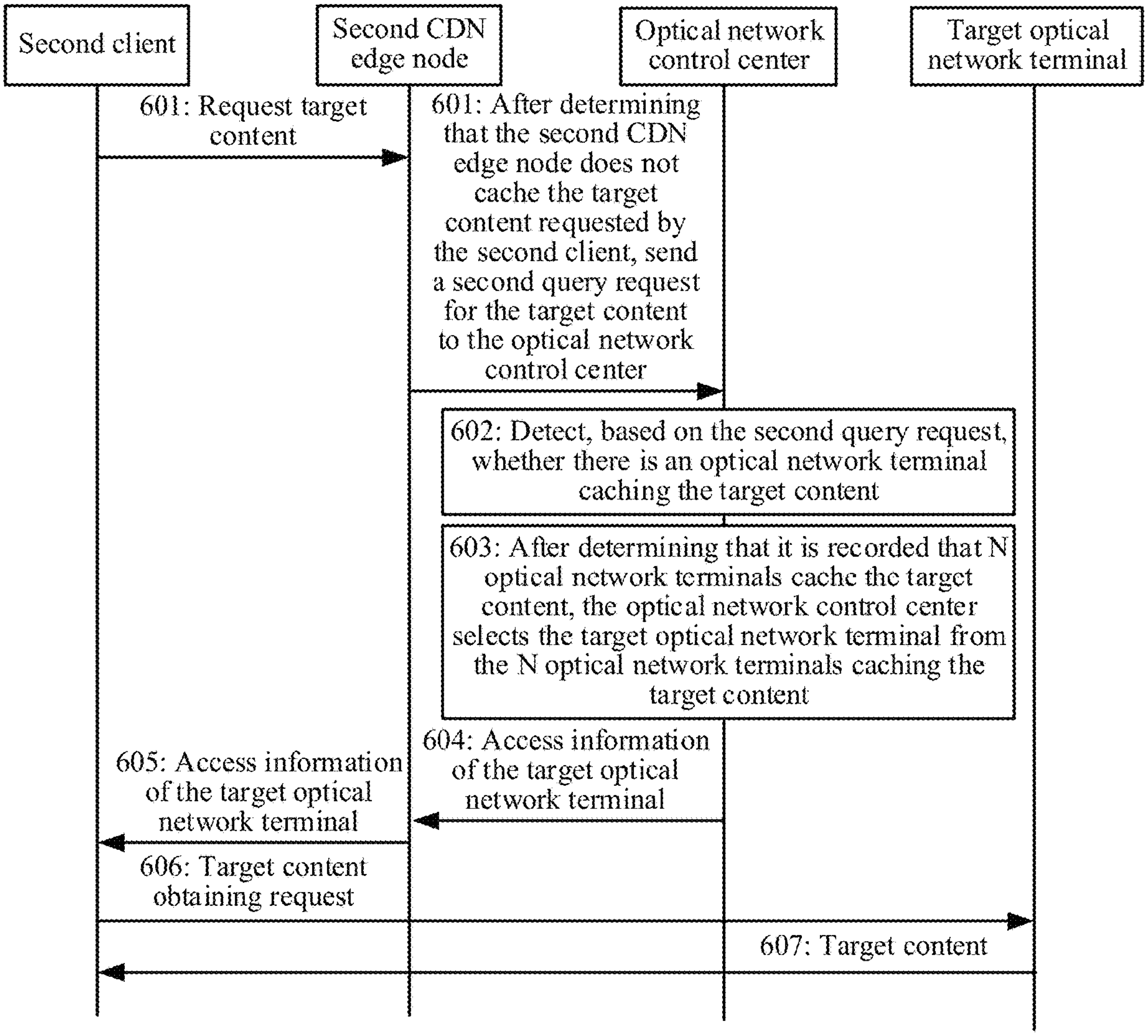
FIG. 6 is another schematic flowchart of a content delivery method according to an embodiment of this disclosure.

To further understand a working procedure of a CDN system combined with an optical network terminal, the following describes the working procedure with reference to FIG. 5 and FIG. 6. FIG. 5 is a schematic flowchart of a content delivery method according to an embodiment of this disclosure. The method may be implemented by using the system shown in FIG. 2. As shown in FIG. 5, the method includes the following steps.

501: After determining that a first CDN edge node does not cache target content requested by a first client, the first CDN edge node sends a first query request for the target content to an optical network control center.

In this embodiment, when a user needs to obtain the target content, the first client may be used to send a first content request to the first CDN edge node in a plurality of CDN edge nodes (which may also be understood as a CDN edge node in the plurality of CDN edge nodes). The first content request is used to request the target content. In this case, the first CDN edge node may determine, based on the first content request, that the first client needs to obtain the target content. Therefore, the first CDN edge node may detect whether the first CDN edge node caches the target content. If determining that the first CDN edge node does not cache the target content, the first CDN edge node generates the first query request based on the first content request, and sends the first query request to the optical network control center. The first query request is used to notify that the first CDN edge node does not cache the target content, and whether there is a usable optical network terminal caching the target content may be queried.

502: The optical network control center detects, based on the first query request, whether there is an optical network terminal caching the target content.

After receiving the query request from the first CDN edge node, the optical network control center may detect, based on the first query request, whether there is an optical network terminal caching the target content.

A content index table is disposed in the optical network control center, and the content index table records a correspondence between content and an optical network terminal storing the content. Therefore, the optical network control center may traverse the content index table based on the first query request, to search for whether there is an optical network terminal storing the target content.

503: If there is no optical network terminal storing the target content, the optical network control center notifies the first CDN edge node to request the target content from a CDN central node.

If there is no optical network terminal storing the target content, the optical network control center needs to first enable the first CDN edge node to cache the target content, to indirectly enable some optical network terminals to cache the target content by using the first CDN edge node. Therefore, the optical network control center may first notify the first CDN edge node to request the target content from the CDN central node.

504: The first CDN edge node obtains the target content from the CDN central node.

505: The first CDN edge node sends the target content to the first client.

After receiving the notification from the optical network control center, the first CDN edge node may obtain the target content from the CDN central node, and cache the target content in a storage of the first CDN edge node. Then, the first CDN edge node may further use the target content as a first content response, and send the target content to the first client. In this way, the first client may successfully receive the target content, to provide the target content for a user using the first client.

Further, after returning the target content to the first client, the first CDN edge node may further record that the target content has been requested once, to update a quantity of request times of the target content (which may also be understood as a total quantity of request times of the target content in a time period). In this case, the first CDN edge node may synchronize the quantity of request times of the target content with the optical network control center, and a CDN edge node other than the first CDN edge node may also synchronize the quantity of request times of the target content with the optical network control center. In this case, the optical network control center may collect statistics on a total quantity of times of requests that are received by all CDN edge nodes and that are for the target content.

506: The optical network control center sends a content pull instruction for the target content cached in the first CDN edge node to N optical network terminals, where N is a positive integer greater than 0.

After the first CDN edge node obtains the target content, the optical network control center may determine the N optical network terminals (where N is a positive integer greater than 0), and send the content pull instruction for the target content cached in the first CDN edge node to the N optical network terminals. The content pull instruction indicates the N optical network terminals to obtain the target content from the first CDN edge node.

It is assumed that a quantity of optical network terminals in the foregoing system is K (where K is greater than N), and the optical network control center may determine the N optical network terminals in the following manner.

After synchronizing the quantity of request times of the target content with the first CDN edge node, the optical network control center may determine a value of N based on the quantity of request times of the target content. Then, the optical network control center may remove an unusable optical network terminal from the K optical network terminals, and select the N optical network terminals, from the remaining usable optical network terminals, as an optical network terminal that is to cache the target content. Generally, the quantity of request times of the target content is positively correlated with N (in other words, a larger quantity of request times of the target content indicates a larger value of N). For example, when the quantity of request times of the target content is 100, the optical network control center may select 10 optical network terminals from the K optical network terminals to cache the target content. When the quantity of request times of the target content is increased to 200, the optical network control center may select 20 optical network terminals from the K optical network terminals to cache the target content.

Further, the N optical network terminals are usable optical network terminals. In other words, the N optical network terminals meet at least one of the following items: currently used downlink bandwidth is less than a preset first threshold, a total quantity of cached content is less than a preset second threshold, storage space is greater than or equal to a preset third threshold, CPU usage is less than a preset fourth threshold, and load is less than a preset fifth threshold. It should be noted that values of the preset first threshold, the preset second threshold, the preset third threshold, the preset fourth threshold, and the preset fifth threshold may be set based on actual requirements. This is not limited herein.

507: The N optical network terminals separately obtain, based on the content pull instruction, the target content from the first CDN edge node and cache the target content.

After the content pull instruction is received, for any optical network terminal in the N optical network terminals, the optical network terminal may obtain the target content from the first CDN edge node based on the content pull instruction, and cache the target content in a storage of the optical network terminal. The remaining optical network terminal other than the optical network terminal in the N optical network terminals may also perform operations similar to operations performed by the optical network terminal. Therefore, all of the N optical network terminals may cache the target content. In other words, the N optical network terminals may jointly complete preheating of the target content.

508: The optical network control center receives caching success notifications from the N optical network terminals.

After completing caching of the target content (in other words, completing the preheating of the target content), the N optical network terminals may separately send the caching success notifications to the optical network control center, to notify the optical network control center that the target content is successfully cached.

509: The optical network control center records, based on the caching success notifications, the N optical network terminals as optical network terminals caching the target content.

After receiving the caching success notifications from the N optical network terminals, the optical network control center may determine that the N optical network terminals successfully cache the target content, and record the N optical network terminals as optical network terminals storing the target content. In other words, the target content and access information of the N optical network terminals is added to the content index table. The access information is, for example, a domain name, an IP address, or other information that can be addressed on a network. Therefore, a correspondence between the target content and the N optical network terminals is constructed. In this way, the content index table includes the correspondence between the target content and the optical network terminal storing the target content. Therefore, when a second client subsequently requests to access the target content again, the optical network control center may schedule the optical network terminal storing the target content, to provide the target content for the second client, and implement an acceleration service of content provision.

The CDN system provided in this embodiment of this disclosure includes the CDN central node, the plurality of CDN edge nodes, the optical network control center, and a plurality of optical network terminals. After determining that the first CDN edge node in the plurality of CDN edge nodes does not cache the target content requested by the first client, the first CDN edge node sends the first query request to the optical network control center. Then, the optical network control center detects, based on the first query request, whether there is an optical network terminal storing the target content. If there is no optical network terminal storing the target content, the optical network control center controls the first CDN edge node to request the target content from the CDN central node. After the first CDN edge node obtains the target content from the CDN central node, the optical network control center may send the content pull instruction for the target content cached in the first CDN edge node to the N optical network terminals, so that the N optical network terminals separately obtain the target content from the first CDN edge node based on the content pull instruction, to complete the caching of the target content. In the foregoing process, because the optical network terminal may be a device customized by an operator (in other words, the optical network terminal is visible to the operator), the operator may dispose a new dedicated WAN interface for the optical network terminal, and configure specific bandwidth resources for the WAN interface. In this case, the optical network terminal may communicate with the first CDN edge node and the optical network control center through the dedicated WAN interface, and enjoy bandwidth resources of the dedicated WAN interface, without occupying home bandwidth resources of the user, so that internet access experience of the user is not affected.

FIG. 6 is another schematic flowchart of a content delivery method according to an embodiment of this disclosure. The method may be implemented by using the system shown in FIG. 2, and the embodiment shown in FIG. 6 may be considered to be implemented after the embodiment shown in FIG. 5. As shown in FIG. 6, the method includes the following steps.

601: After determining that a second CDN edge node does not cache target content requested by a second client, the second CDN edge node sends a second query request for the target content to an optical network control center.

602: The optical network control center detects, based on the second query request, whether there is an optical network terminal caching the target content.

For descriptions of step 601 and step 602, refer to related description parts of step 501 and step 502 in the embodiment shown in FIG. 5. Details are not described herein again.

It should be noted that, a first client and the second client are usually two different clients, and a first CDN edge node and the second CDN edge node are usually two different CDN edge nodes in a plurality of CDN edge nodes.

603: After determining that it is recorded that N optical network terminals cache the target content, the optical network control center selects a target optical network terminal from the N optical network terminals caching the target content.

It can be learned based on the embodiment in FIG. 5 that, the optical network control center has recorded that the N optical network terminals cache the target content, and it indicates that the target content is content that has been preheated by completing the foregoing steps. Therefore, the optical network control center selects the target optical network terminal, from the N optical network terminals caching the target content, as an optical network terminal that may be directly accessed by the second client to obtain the target content.

The optical network control center may determine the target optical network terminal in the following manner.

The optical network control center may select the target optical network terminal from the N optical network terminals based on one or any combination of load, used downlink bandwidth, total quantities of cached content, storage space, and central processing unit CPU usage of the N optical network terminals caching the target content. It should be noted that, for any optical network terminal in the N optical network terminals caching the target content, the optical network control center may determine performance of the optical network terminal based on one or any combination of load, used downlink bandwidth, a total quantity of cached content, storage space, and CPU usage of the optical network terminal. In this way, the optical network control center may determine performance of the N optical network terminals, and compare the performance of the N optical network terminals with each other, to use an optical network terminal with optimal performance as the target optical network terminal. For example, the optical network control center may consider, in the N optical network terminals, an optical network terminal with maximum storage space, and lowest CPU usage as the optical network terminal with the optimal performance, and determine the optical network terminal with the optimal performance as the target optical network terminal.

It should be understood that, the foregoing descriptions are merely an example of determining the performance of the optical network terminal by using one or any combination of the load, the used downlink bandwidth, the total quantity of cached content, the storage space, and the CPU usage. During actual application, equivalent information or more information may also be used to determine performance of an optical network terminal. For example, a determining criterion may be selected from the foregoing status information, such as remaining bandwidth of a dedicated WAN interface, I/O usage, or the like. This is not limited herein.

604: The optical network control center sends access information of the target optical network terminal to the second CDN edge node.

After determining the target optical network terminal, the optical network control center sends the access information of the target optical network terminal to the second CDN edge node. The access information of the target optical network terminal includes an IP address and/or a domain name of the target optical network terminal, and/or the like.

605: The second CDN edge node sends the access information of the target optical network terminal to the second client.

After obtaining the access information of the target optical network terminal, the second CDN edge node may send the access information of the target optical network terminal to the second client used by a user.

606: The second client sends a target content obtaining request to the target optical network terminal based on the access information of the target optical network terminal.

607: The target optical network terminal sends the target content to the second client based on the target content obtaining request.

After obtaining the access information of the target optical network terminal, the second client may send, to the target optical network terminal based on the access information of the target optical network terminal, the target content obtaining request used to request the target content, so that the target optical network terminal sends the target content to the second client based on the target content obtaining request, for the user for use.

It should be noted that the second client may communicate with the target optical network terminal based on a public communication protocol. For example, the client may communicate with the target optical network terminal based on HTTP, HTTPS, or the like.

Further, the second CDN edge node may further record that the target content has been requested for one more time. Therefore, a quantity of request times of the target content may be updated, and a quantity of request times of the target content may be synchronized with the optical network control center.

It should be noted that, after obtaining the latest quantity of request times of the target content, the optical network control center may determine, based on the quantity of request times, a change trend of a total quantity of request times of the target content in a time period (for example, the quantity of request times of the target content in the embodiment shown in FIG. 5 is compared with the quantity of request times of the target content in the embodiment shown in FIG. 6, or the like). If the trend is a significantly increasing trend, it indicates that popularity of the target content is increasing. Therefore, the optical network control center may select, based on the N optical network terminal that have cached the target content, several optical network terminals from other optical network terminals that have not cached the target content, to cache the target content. If the trend is a significantly decreasing trend, it indicates that popularity of the target content is continuously attenuating. Therefore, the optical network control center may select several optical network terminals from the N optical network terminal that have cached the target content, and delete the target content cached by the optical network terminals. If the trend is an upward and downward fluctuation trend, it indicates that popularity of the target content is stable. Therefore, the optical network control center may not perform any operation on the N optical network terminal that have cached the target content.

The CDN system provided in this embodiment of this disclosure includes a CDN central node, the plurality of CDN edge nodes, the optical network control center, and a plurality of optical network terminals. After determining that the second CDN edge node in the plurality of CDN edge nodes does not cache the target content requested by the second client, the second CDN edge node sends the second query request to the optical network control center. Then, the optical network control center detects, based on the second query request, whether there is an optical network terminal storing the target content. Because that the N optical network terminal cache the target content has been recorded, the optical network control center may select the target optical network terminals from the N optical network terminals, and send the access information of the target optical network terminals to the second CDN edge node. Then, the second CDN edge node may send the access information of the target optical network terminals to the second client, so that the second client obtains the target content from the target optical network terminals based on the access information. In the foregoing process, because the target optical network terminal may be a device customized by an operator (in other words, the optical network terminal is visible to the operator), the operator may dispose a new dedicated WAN interface for the target optical network terminal, and configure specific bandwidth resources for the WAN interface. In this case, the target optical network terminal may communicate with the client through the dedicated WAN interface, and enjoy bandwidth resources of the dedicated WAN interface, without occupying home bandwidth resources of the user, so that internet access experience of the user is not affected.

Further, HTTP, HTTPS, or other manners are used between the client and the target optical network terminal to implement an acceleration service of content provision. Because open protocols are used in these manners, an SDK is not needed, an application on the client does not need to be modified in an immersive manner, and these manners can be widely applied.

Figure 7:
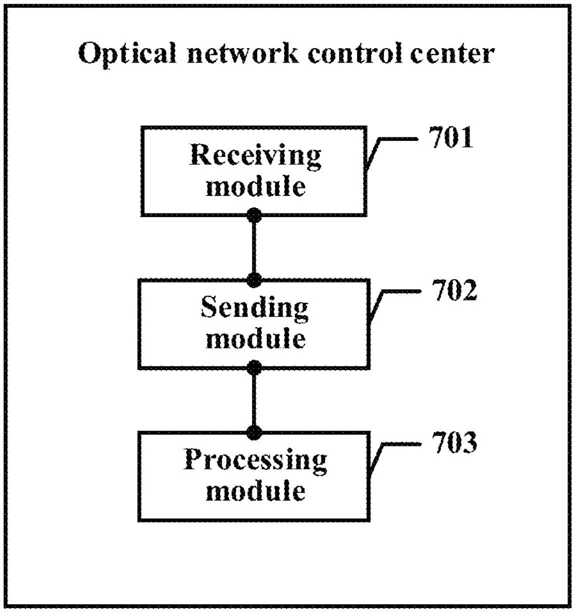
FIG. 7 is a schematic diagram of a structure of an optical network control center according to an embodiment of this disclosure.

The foregoing describes in detail the content delivery methods provided in embodiments of this disclosure. The following describes an optical network control center and an optical network terminal provided in embodiments of this disclosure. FIG. 7 is a schematic diagram of a structure of an optical network control center according to an embodiment of this disclosure. The optical network control center is located in a CDN system, and the CDN system further includes a CDN central node, a plurality of CDN edge nodes, and a plurality of optical network terminals. As shown in FIG. 7, the optical network control center includes the following.

A receiving module 701 is configured to receive a first query request that is sent by a first CDN edge node and that is for target content. For example, the receiving module 701 may implement step 501 in the embodiment shown in FIG. 5.

A sending module 702 is configured to notify, based on the first query request, the first CDN edge node to request the target content from the CDN central node. For example, the sending module 702 may implement step 503 in the embodiment shown in FIG. 5.

The sending module 702 is further configured to send a content pull instruction for the target content cached in the first CDN edge node to N optical network terminals, where N is a positive integer greater than 0. For example, the sending module 702 may implement step 506 in the embodiment shown in FIG. 5.

The receiving module 701 is further configured to receive caching success notifications sent by the N optical network terminals. For example, the receiving module 701 may implement step 508 in the embodiment shown in FIG. 5.

A processing module 703 is configured to record, based on the caching success notifications, that the N optical network terminals cache the target content. For example, the processing module 703 may implement step 509 in the embodiment shown in FIG. 5.

The CDN system provided in this embodiment of this disclosure includes the CDN central node, the plurality of CDN edge nodes, the optical network control center, and the plurality of optical network terminals. After determining that the first CDN edge node in the plurality of CDN edge nodes does not cache the target content requested by a first client, the first CDN edge node sends the first query request to the optical network control center. Then, the optical network control center detects, based on the first query request, whether there is an optical network terminal storing the target content. If there is no optical network terminal storing the target content, the optical network control center controls the first CDN edge node to request the target content from the CDN central node. After the first CDN edge node obtains the target content from the CDN central node, the optical network control center may send the content pull instruction for the target content cached in the first CDN edge node to the N optical network terminals, so that the N optical network terminals separately obtain the target content from the first CDN edge node based on the content pull instruction, to complete caching of the target content. In the foregoing process, because the optical network terminal may be a device customized by an operator (in other words, the optical network terminal is visible to the operator), the operator may dispose a new dedicated WAN interface for the optical network terminal, and configure specific bandwidth resources for the WAN interface. In this case, the optical network terminal may communicate with the first CDN edge node and the optical network control center through the dedicated WAN interface, and enjoy bandwidth resources of the dedicated WAN interface, without occupying home bandwidth resources of a user, so that internet access experience of the user is not affected.

In a possible implementation, the receiving module 701 is further configured to receive a second query request that is sent by a second CDN edge node and that is for the target content. For example, the receiving module 701 may implement step 601 in the embodiment shown in FIG. 6. The processing module 703 is further configured to: determine, based on the second query request, that the processing module 703 records that the N optical network terminals cache the target content, and select a target optical network terminal from the N optical network terminals. For example, the processing module 703 may implement step 603 in the embodiment shown in FIG. 6. The sending module 702 is further configured to send access information of the target optical network terminal to the second CDN edge node. For example, the sending module 702 may implement step 604 in the embodiment shown in FIG. 6.

In a possible implementation, the processing module 703 is configured to select the target optical network terminal from the N optical network terminals based on one or any combination of load, used downlink bandwidth, total quantities of cached content, storage space, and central processing unit CPU usage of the N optical network terminals.

In a possible implementation, the optical network control center is connected to K optical network terminals. The processing module 703 is further configured to: synchronize a quantity of request times of the target content with a plurality of CDN edge nodes, and select the N optical network terminals from the K optical network terminals based on the quantity of request times. A larger quantity of request times indicates a larger value of N, and K is a positive integer greater than N.

Figure 8:
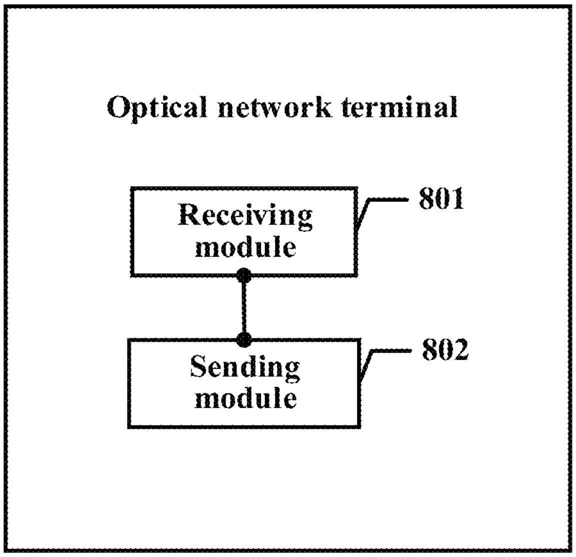
FIG. 8 is another schematic diagram of a structure of an optical network terminal according to an embodiment of this disclosure.

FIG. 8 is a schematic diagram of a structure of an optical network terminal according to an embodiment of this disclosure. The optical network terminal is one of a plurality of optical network terminals included in a CDN system, and the CDN system further includes a CDN central node, a plurality of CDN edge nodes, and an optical network control center. As shown in FIG. 8, the optical network terminal includes the following.

A receiving module 801 is configured to: receive a content pull instruction that is sent by the optical network control center and that is for target content cached in a first CDN edge node, and obtain the target content from the first CDN edge node for caching. For example, the receiving module 801 is configured to implement step 506 and step 507 in the embodiment shown in FIG. 5.

A sending module 802 is configured to send a caching success notification to the optical network control center. For example, the sending module 802 is configured to implement step 508 in the embodiment shown in FIG. 5.

The receiving module 801 is further configured to receive a target content obtaining request sent by a second client. For example, the receiving module 801 is configured to implement step 606 in the embodiment shown in FIG. 6.

The sending module 802 is further configured to send the target content to the second client based on the target content obtaining request. For example, the sending module 802 is configured to implement step 607 in the embodiment shown in FIG. 6.

The CDN system provided in this embodiment of this disclosure includes the CDN central node, the plurality of CDN edge nodes, the optical network control center, and the plurality of optical network terminals. After determining that a second CDN edge node in the plurality of CDN edge nodes does not cache the target content requested by the second client, the second CDN edge node sends a second query request to the optical network control center. Then, the optical network control center detects, based on the second query request, whether there is an optical network terminal storing the target content. Because that N optical network terminal cache the target content has been recorded, the optical network control center may select the target optical network terminals from the N optical network terminals, and send access information of the target optical network terminals to the second CDN edge node. Then, the second CDN edge node may send the access information of the target optical network terminals to the second client, so that the second client obtains the target content from the target optical network terminals based on the access information. In the foregoing process, because the target optical network terminal may be a device customized by an operator (in other words, the optical network terminal is visible to the operator), the operator may dispose a new dedicated WAN interface for the target optical network terminal, and configure specific bandwidth resources for the WAN interface. In this case, the target optical network terminal may communicate with the client through the dedicated WAN interface, and enjoy bandwidth resources of the dedicated WAN interface, without occupying home bandwidth resources of a user, so that internet access experience of the user is not affected.

It should be noted that, content such as information exchange between the modules/units of the apparatus and implementation processes thereof is based on the same idea as the method embodiments of this disclosure, and produces the same technical effects as the method embodiments of this disclosure. For specific content, refer to the foregoing descriptions in the method embodiments shown in embodiments of this disclosure. Details are not described herein again.

Figure 9:
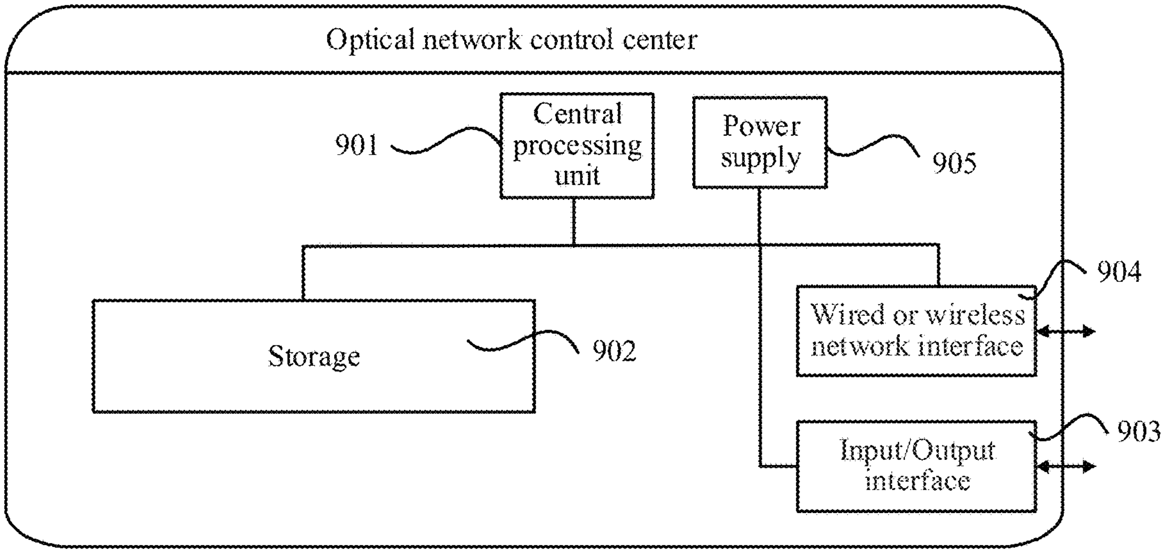
FIG. 9 is another schematic diagram of a structure of an optical network control center according to an embodiment of this disclosure.

FIG. 9 is another schematic diagram of a structure of an optical network control center according to an embodiment of this disclosure. As shown in FIG. 9, one embodiment of the optical network control center may include one or more central processing units 901, a storage 902, an input/output interface 903, a wired or wireless network interface 904, and a power supply 905.

The storage 902 may perform temporary storage or permanent storage. Further, the central processing unit 901 may be configured to communicate with the storage 902, and perform, on the optical network control center, a series of instruction operations in the storage 902.

In this embodiment, the central processing unit 901 may perform operations performed by the optical network control center in the embodiment shown in FIG. 5 or FIG. 6. Details are not described herein again.

In this embodiment, division of specific function modules in the central processing unit 901 may be similar to the division manners of the receiving module, the sending module, the processing module, and other modules described in FIG. 7. Details are not described herein again.

Figure 10:
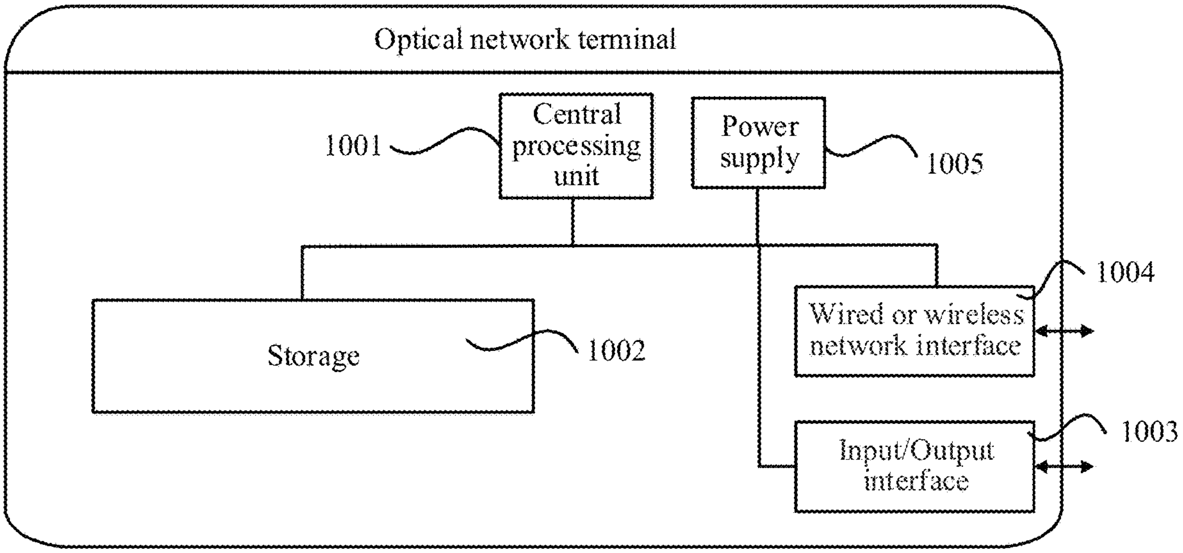
FIG. 10 is another schematic diagram of a structure of an optical network terminal according to an embodiment of this disclosure.

FIG. 10 is another schematic diagram of a structure of an optical network terminal according to an embodiment of this disclosure. As shown in FIG. 10, one embodiment of the optical network terminal may include one or more central processing units 1001, a storage 1002, an input/output interface 1003, a wired or wireless network interface 1004, and a power supply 1005.

The storage 1002 may perform temporary storage or permanent storage. Further, the central processing unit 1001 may be configured to communicate with the storage 1002, and perform, on the optical network terminal, a series of instruction operations in the storage 1002.

In this embodiment, the central processing unit 1001 may perform operations performed by the optical network terminal in the embodiment shown in FIG. 5 or FIG. 6. Details are not described herein again.

In this embodiment, division of specific function modules in the central processing unit 1001 may be similar to the division manner of the receiving module, the sending module and other modules described in FIG. 8. Details are not described herein again.

An embodiment of this disclosure further relates to a computer storage medium, including computer-readable instructions. When the computer-readable instructions are executed, steps performed by the optical network control center in the embodiment shown in FIG. 5 or FIG. 6 are implemented, or steps performed by the optical network terminal in the embodiment shown in FIG. 5 or FIG. 6 are implemented.

An embodiment of this disclosure further relates to a computer program product including instructions. When the instructions are run on a computer, the computer is enabled to implement steps performed by the optical network control center in the embodiment shown in FIG. 5 or FIG. 6, or implement steps performed by the optical network terminal in the embodiment shown in FIG. 5 or FIG. 6.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

Units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, function units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions may be embodied in a form of a software product. The computer software product is stored in a storage medium and includes several instructions for instructing a computer device (which may be a personal computer, a server, a network device, or the like) to perform all or some of the steps of the methods in embodiments of this disclosure. The foregoing storage medium includes any medium that can store program code, such as a USB flash drive, a removable hard disk, a read-only memory (ROM), a random-access memory (RAM), a magnetic disk, an optical disc, or the like.

What is claimed is:

1. A system comprising:
a content delivery network (CDN) central node;
a plurality of content delivery network (CDN) edge nodes comprising a first CDN edge node configured to:
receive a first content request from a first client, wherein the first content request requests target content;
send, when the first CDN edge node does not cache the target content, a first query request for the target content;
obtain the target content from the CDN central node in response to the first query request; and
cache the target content;
an optical network control center, configured to:
receive the first query request from the first CDN edge node;
notify, based on the first query request, the first CDN edge node to request the target content from the CDN central node; and
send a content pull instruction for the target content cached in the first CDN edge node; and
N optical network terminals, configured to:
receive the content pull instruction from the optical network control center;
separately obtain, based on the content pull instruction, the target content from the first CDN edge node;
cache the target content; and
separately send caching success notifications to the optical network control center,
wherein the optical network control center is further configured to record, based on the caching success notifications, that the N optical network terminals cache the target content.

2. The system according to claim 1, wherein the CDN edge nodes further comprise a second CDN edge node configured to:
receive a second content request from a second client, wherein the second content request requests second content;
send, when the second CDN edge node does not cache second target content, a second query request for the target content to the optical network control center; and
send access information to the second client, wherein the access information indicates to obtain the target content from a target optical network terminal, and
wherein the optical network control center is further configured to:
select, based on the second query request and when the N optical network terminals cache the target content, the target optical network terminal from the N optical network terminals; and
send the access information to the second CDN edge node.

3. The system according to claim 2, wherein the optical network control center is further configured to select the target optical network terminal based on a load, a used downlink bandwidth, total quantities of cached content, a storage space, or central processing unit (CPU) usage of the N optical network terminals.

4. The system according to claim 1, wherein the optical network control center is communicatively coupled to K optical network terminals, where K is a positive integer greater than N, and wherein the optical network control center is further configured to:

synchronize a quantity of request times of the target content with the CDN edge nodes; and select the N optical network terminals from the K optical network terminals based on the quantity of request times, wherein a larger quantity of request times indicates a larger value of N.

5. The system according to claim 1, wherein the first CDN edge node is further configured to:

cache the target content after obtaining the target content from the CDN central node; and send the target content to the first client.

6. The system according to claim 2, wherein the target optical network terminal comprises a dedicated wireless access network (WAN) interface configured to communicate with the first CDN edge node and the optical network control center through bandwidth resources assigned to the dedicated WAN without occupying home bandwidth resources of a user.

7. The system according to claim 2, wherein the target optical network terminal comprises a dedicated wireless access network (WAN) interface configured to communicate with the second client through bandwidth resources assigned to the dedicated WAN without occupying home bandwidth resources of a user.

8. The system according to claim 3, wherein the optical network control center is further configured to select as the target optical network terminal from the N optical network terminals that has a lowest load, a minimum used downlink bandwidth, a smallest total quantity of cached content, a maximum storage space, or a lowest CPU usage.

9. The system according to claim 4, wherein the optical network control center is further configured to evaluate, based on the quantity of request times, a value of N for selecting the N optical network terminals from the K optical network terminals.

10. A system comprises:

a plurality of content delivery network (CDN) edge nodes comprising a first CDN edge node configured to:

receive a content request from a first client, wherein the first content request requests target content;

send, when the first CDN edge node does not cache the target content, a query request for the target content; and send access information to the first client, wherein the access information indicates to obtain the target content from a target optical network terminal; and an optical network control center, configured to:

receive the query request from the first CDN edge node;

select, based on the query request and when N optical network terminals cache the target content, the target optical network terminal from the N optical network terminals, where N is a positive integer greater than 0; and send the access information of the target optical network terminal to the first CDN edge node.

11. The system according to claim 10, wherein the optical network control center is coupled to K optical network terminals, where K is a positive integer greater than N, and is further configured to:

synchronize a quantity of request times of the target content with the plurality of CDN edge nodes; and select the N optical network terminals from the K optical network terminals based on the quantity of request times, wherein a larger quantity of request times indicates a larger value of N.

12. The system according to claim 10, wherein the first CDN edge node is further configured to;

cache the target content after obtaining the target content from a CDN central node; and send the target content to the first client.

13. A method comprising:

receiving, by an optical network control center from a first CDN edge node, a first query request for target content;

notifying, by the optical network control center and based on the first query request, the first CDN edge node to request the target content from a CDN central node;

sending, by the optical network control center to N optical network terminals, a content pull instruction for the target content in the first CDN edge node, wherein N is a positive integer greater than 0; and recording, by the optical network control center and based on caching success notifications from the N optical network terminals, that the N optical network terminals cache the target content.

14. The method according to claim 13, wherein the method further comprises:

receiving, by the optical network control center from a second CDN edge node, a second query request for the target content;

selecting, by the optical network control center based on the second query request and when the N optical network terminals cache the target content, a target optical network terminal from the N optical network terminals; and sending access information of the target optical network terminal to the second CDN edge node.

15. The method according to claim 14, further comprising: selecting, by the optical network control center, the target optical network terminal from the N optical network terminals based on load, used downlink bandwidth, total quantities of cached content, storage space, or central processing unit (CPU) usage of the N optical network terminals.

16. The method according to claim 13, further comprising:

synchronizing, by the optical network control center, a quantity of request times of the target content with a plurality of CDN edge nodes; and selecting the N optical network terminals from K optical network terminals based on the quantity of request times, wherein a larger quantity of request times indicates a larger value of N.

17. An optical network control center comprising:

a memory configured to store instructions; and a processor coupled to the memory and configured to execute the instructions to cause the optical network control center to:

receive, from a first CDN edge node, a first query request for target content;

notify, based on the first query request, the first CDN edge node to request the target content from a CDN central node;

send, to N optical network terminals, a content pull instruction for the target content in the first CDN edge node, where N is a positive integer greater than 0;

receive caching success notifications from the N optical network terminals; and record, based on the caching success notifications, that the N optical network terminals cache the target content.

18. The optical network control center according to claim 17, wherein the processor is further configured to execute the instructions to cause the optical network control center to:

receive, from a second CDN edge node, a second query request for the target content;

select, based on the second query request and when the N optical network terminals cache the target content, a target optical network terminal from the N optical network terminals; and send access information of the target optical network terminal to the second CDN edge node.

19. The optical network control center according to claim 18, wherein the processor is further configured to execute the instructions to cause the optical network control center to: select, the target optical network terminal from the N optical network terminals based on load, used downlink bandwidth, total quantities of cached content, storage space, and central processing unit (CPU) usage of the N optical network terminals.

20. The optical network control center according to claim 17, wherein the processor is further configured to execute the instructions to cause the optical network control center to:

synchronize a quantity of request times of the target content with a plurality of CDN edge nodes; and select the N optical network terminals from K optical network terminals based on the quantity of request times, wherein a larger quantity of request times indicates a larger value of N, where K is a positive integer greater than N.

* * * * *